United States Patent Office 3,537,130
Patented Nov. 3, 1970

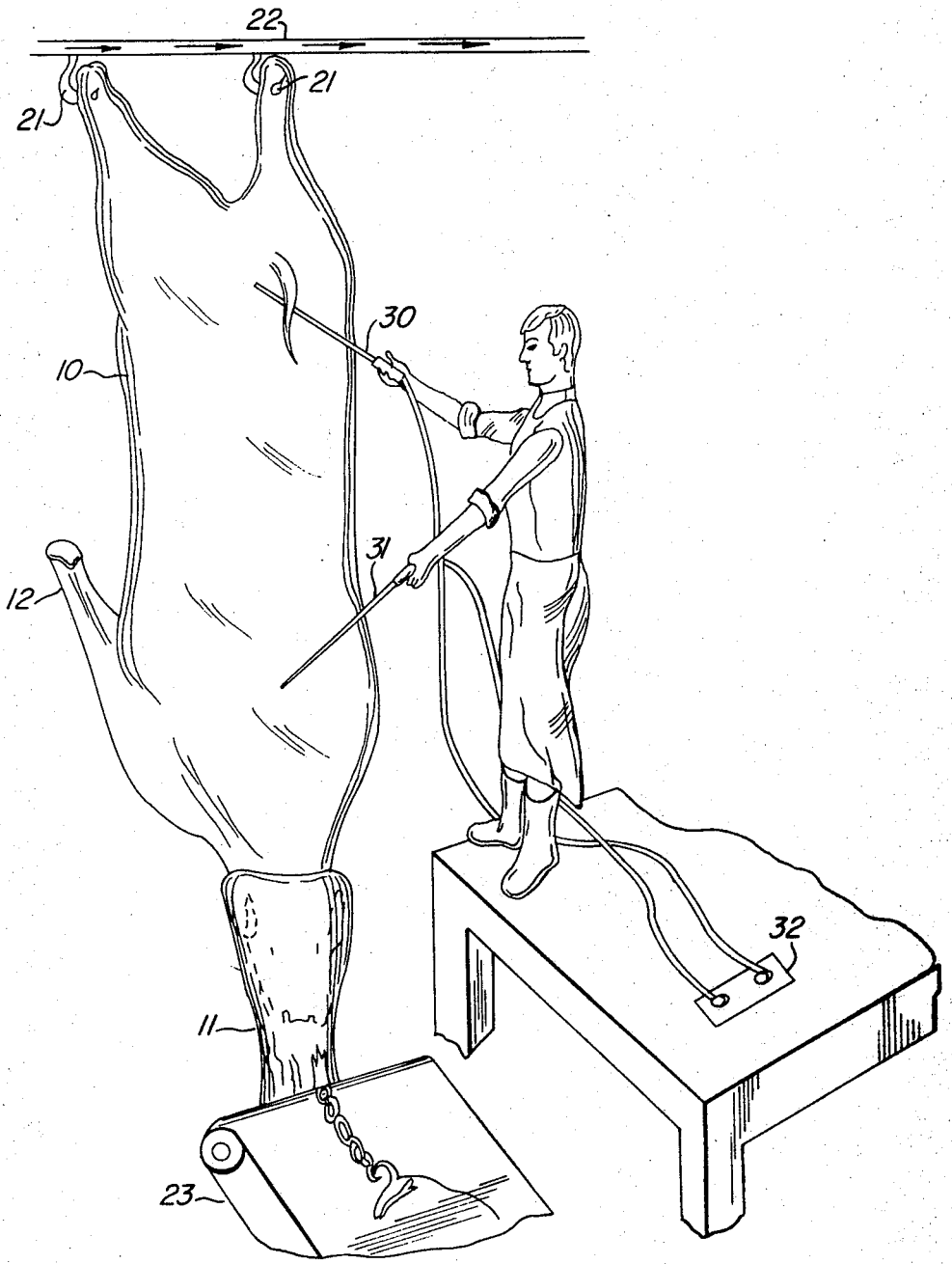

3,537,130
HIDE PULLING PROCESS
Richard L. McDonnell, White Bear Lake, Minn., assignor to Armour and Company, Chicago, Ill., a corporation of Delaware
Filed July 15, 1968, Ser. No. 744,907
Int. Cl. A22b 5/16
U.S. Cl. 17—50    9 Claims

ABSTRACT OF THE DISCLOSURE

Passing an electric current between electrodes through an animal carcass as the hide is pulled therefrom, to thereby prevent damage to the carcass vertebrae by the hide pulling forces.

BACKGROUND OF THE INVENTION

This invention pertains to the mechanical removal or pulling of hides from livestock carcasses such as bulls, cows, steers, calves, sheep, hogs and the like. More particularly, it relates to the use of electrical stimulation as an adjunct to the mechanical removal of hides from livestock carcasses.

It was a common practice for many years in the meat packing and process industries to remove the hides from livestock entirely by hand skinning. Hides were removed in this manner by highly skilled hide skinners, and great care was exercised to prevent damage to either the carcass or the hide during the hide skinning operation.

More recently, various mechanical devices have been developed to perform the hide removal steps previously accomplished manually. The development of mechanical hide removal equipment has been largely motivated by the increased efficiency and economy offered by the use of mechanical devices as compared to skilled manual labor, especially in large scale commercial packing plants where large numbers of carcasses are processed.

Although many mechanical devices and methods for hide removal are known in the art, they have not proven to be entirely satisfactory. Some devices remove only a small percantage of the hide by mechanical means, leaving a large remaining portion to be removed by tedious and expensive manual labor. Other devices have been designed to remove substantially all of the hide by mechanical means; however, these devices often produce defective hides and carcasses which are damaged and of decreased commercial value.

A substantial cause of many of the problems common to mechanical hide removal methods is the fact that great forces must be applied to both the carcass and the hide as the hide is pulled from the carcass. It has been discovered that larger forces must generally be used when pulling the hide from the forequarter and head of the carcass than are necessary to pull the hide from the carcass back area. The application of large forces in tension to the carcass, more specifically to the spine of the animal, often results in damage.

For example, it has been observed that when pulling the hide from suspended livestock carcasses prior to the removal of the forelegs and head, the forces exerted on the hide and carcass often cause the spinal vertebra to separate, damaging the surrounding meat. This vertebra separation most commonly occurs in the loin area, which is the area from which the most valuble cuts of meat are obtained. Damage to the loin area is therefore particularly costly and commercially unacceptable.

It is an object of the present invention therefore to provide a process which can be used in conjunction with known livestock hide removal apparatuses and methods, which process will eliminates or minimize carcass damage caused by hide pulling forces.

It is a further object of the present invention to provide a process in which carcass damage during hide removal is minimized and which process can be integrated with a wide variety of mechanical hide removal devices and methods with a minimum of interference with preexisting equipment and processes.

Further objects and advantages of the invention will become more apparent as the specification proceeds.

According to the present invention, electrical stimulus is employed in conjunction with mechanical hide removal in order to minimize or eliminate damage to the carcass caused by the hide pulling forces. In the practice of the invention a plurality of electrodes may be inserted into the carcass and an electric current passed between the electrodes through the carcass as portions of hide are pulled therefrom. The electric current excites muscle structure and causes the carcass muscles to stiffen. The carcass may become substantially rigid. Due to the flexing of the carcass muscles, the forces in tension created by the hide puller are absorbed by the muscles of the carcass rather than by the skeleton of the carcass, more specifically the spine. In this way separation of the spinal vertebra and the damage to the carcass caused thereby is effectively eliminated. After the hide has been removed, the application of electric current is discontinued and the electrodes withdrawn. The carcass then returns to its normal state and can be further processed as may be desired.

DESCRIPTION OF PREFERRED EMBODIMENTS

The present invention is well adapted to employment in a commercial slaughter or packing house where a substantial number of livestock carcasses are processed. It will be understood however that the process is equally applicable to any circumstance wherein the hide is mechanically pulled from the carcass regardless of the size of the operation and the number of carcasses involved.

The practice almost universally followed in packing house operations involves suspending the animal carcasses from some type of overhead conveyor means which is used to transport the carcasses from one processing station to another. Because the animals are most often killed by severing a major artery in the neck and bled to death, they are customarily suspended by the hind legs with the head lowermost. This particular arrangement of the carcass is in no way essential to the operation of the present process, but is described here because of its wide application in the industry and to facilitate detailed description of the invented process.

In a preferred embodiment of the process, the carcass arrives at the hide removal station suspended by its hind legs from an overhead conveyor rail. It is preferred that a portion of hide has been previously removed in order to allow the electrodes to be directly inserted into the carcass flesh without contacting the hide. This procedure precludes interference of the electrodes with the subsequent hide pulling steps. It will be understood however that this procedure is preferred and that the invention is in no way limited thereto, but embodies also a procedure whereby the electrodes are placed against or inserted through the hide.

After a portion of the hide has been removed as described in the preferred embodiment, a plurality of electrodes are inserted in the carcass, preferably in the areas from which the hide has previously been removed. The precise location of the electrodes is not critical, however it is considered desirable that the electrodes be placed so as to allow the application of electric current to the larger muscle structures of the carcass which support that portion of the carcass which is desired to be protected from the adverse effects of the hide pulling forces. It has been observed that in pulling the hide downwardly from the forequarter and head, damage generally occurs in the loin area of the spine. In that instance it is preferred to place the electrodes in the back of the carcass with at least one electrode in the hindquarter area and at least one electrode in the forequarter area. It is to be emphasized however that this placement represents one embodiment of the invention and that the electrodes can be placed in a variety of other locations on the carcass.

One preferred embodiment is illustrated in the accompanying drawing, in which:

The figure of the drawing is a perspective view of a carcass with electrodes placed thereon.

Referring to the figure of the drawing, a beef carcass 10 has been suspended by the hind legs by hooks or shackles 20 and 21 which may be attached to a fixed support or a moving conveyor rail 22 of the various types that are well known. In this particular illustration the hide 11 has been removed down to the forequarter and head through any suitable hide removal technique. The hide 11 is then attached to a mechanical hide pulling device 23. It is to be understood that the hide pulling device 23 forms no part of the present invention and can be of the winch-type, drum-type, or other suitable hide pullers.

The electrodes 30 and 31 are placed upon or inserted into the carcass 10. These electrodes may be placed upon the carcass without penetrating the surface. However, to insure positive electrical contact and efficient flow of electric current through the carcass, it is preferred that the probes make at least a slight penetration through the surface, to a depth of approximately ¼ inch to 2 inches. After electrodes 30 and 31 have been suitably placed, an electric potential is applied to them, supplied by a suitable power source 32. The resulting current causes the carcass muscles to contract and become tensed. If sufficient potential is applied, the carcass 10 may become virtually rigid as shown by the position of the front leg 12 in the figure. While the carcass is under the influence of the electric current, the hide 11 is pulled from the forequarter and head by operation of the hide pulling device 23.

As soon as the hide pulling forces are relieved the electric current may be terminated. The electrodes 30 and 31 may then be withdrawn from the carcass and sterilized for reuse.

While it is to be understood that any suitable electrodes may be used in the practice of this invention, a particularly well suited apparatus which can be adapted to this process is shown and described in U.S. Pat. No. 3,258,811, "Animal Electrical Stunning Apparatus." It is preferred to modify the apparatus described therein to permit current in the range of 320 to 380 volts and 1 to 4 amperes, and to install elongated electrodes to allow the operator to reach more widely separated points on larger beef carcasses.

The degree of muscle contraction produced by the electric current varies with the size of the carcass and with the voltage applied. Applying the same voltage, greater contraction is observed on smaller carcasses than on the larger carcasses. Moreover, the degree of contraction achieved with a given carcass increases with the voltage. Accordingly, the voltage used can be varied with the size and type of animal carcasses being processed, and can be varied according to the extent of the hide pulling forces applied. Thus it can be seen that a wide range of voltages can be used.

In work with beef carcasses it has been observed that contraction of the muscles can be produced with an electric potential of 10 volts and that virtual rigidity of the carcass muscle structure can be achieved at 480 volts. Substantially larger voltages can be used with satisfactory results. However, since the desired results can be obtained without using extremely high voltages, and in view of the fact that more power is consumed at higher voltages with a resultant cost increase, it is economically desirable to use electric currents of less than 500 volts and 10 amperes. In the removal of the hide from the forequarter and head of beef carcasses by a substantially downward pulling, a voltage of 310 v. to 380 v. and current of 1 to 5 amperes is preferred.

EXAMPLE I

This example is recited to illustrate the type and extent of carcass damage which occurs without benefit of the present invention.

A slaughtered beef carcass was suspended from a rail by the hind legs of the carcass. The front feet were removed and the hide was removed from the rear legs to the forequarter, including the round, rump, cod, rib and back areas. The head was left intact on the carcass. The freed portion of the hide was attached to a pulling apparatus and the remainder of the hide was pulled downwardly from the forequarter and head. Upon subsequent splitting of the carcass in half, the carcass was examined for damage. The spinal vertabrae in the loin area had been pulled apart, and separations up to 3 inches existed between adjacent sides of vertabrae which are normally in intimate contact. The meat in the loin area had been similarly separated and torn.

Examples II, III, and IV illustrate the effect on carcass damage when the present invention is used.

EXAMPLE II

A beef carcass was suspended and prepared as in Example I. After removal of the hide to the forequarter an electrode was inserted into the rump area near the spine to a penetration of approximately ½ to 1 inch. A second electrode was similarly inserted into the center portion of the back area at or near the fifth or sixth rib. The freed portion of the hide was attached to a pulling apparatus as in Example I. As the pulling apparatus was engaged, an electric current of 320 volts, 2 amperes was passed between the electrodes through the carcass and maintained until the remainder of the hide was pulled from the forequarter and head. The electric current caused the carcass muscles to contract and the carcass remained substantially rigid throughout the pulling of the hide from the forequarter and head. The carcass was split and examined as in Example I. There was no discernible separation between any vertabrae nor any discernible tearing or separating of the meat tissues.

EXAMPLE III

A beef carcass was suspended and prepared as in Example I, the hide being removed down to the forequarter. An electrode was placed into the hindquarter and a similar electrode was placed in the forward shoulder area. An electric current of 10 volts and approximately 1 ampere was passed between the electrodes through the carcass. A significant observable contraction of the muscles and stiffening of the carcass occurred as the current was applied.

EXAMPLE IV

A beef carcass was prepared and electrodes inserted as in Example III. An electric current of approximately 480 volts and 4 amperes was passed between the probes through the carcass. The application of the electric current caused marked contraction of the muscles and stiffening of the carcass to an extent that the carcass became substantially rigid.

The results of large scale hide removal operations conducted both with and without the method of the present invention further illustrate its effects and advantages.

Approximately 1200 to 1500 beef carcasses were processed each day for a two week period as described in Example I, that is, the hide was pulled from the forequarter and head without the use of electric stimulation of the carcass as called for in the invented method. Of these carcasses, approximately 60 percent were found to have damaged vertabrae and meat resulting in an average reduction in selling price of $2.00 per carcass. Thereafter, approximately 1200 to 1500 beef carcasses were processed each day for a five month period using the method of the present invention as described in general herein and more specifically in Example II. None of these carcasses were damaged to a degree significant enough to cause any reduction in selling price.

The end result of the invented process is to produce carcasses of increased commercial value. This result obtains from the fact that the skeletal and meat structure of the carcass is not damaged by the hide pulling forces. By allowing the pulling forces to be counteracted and absorbed by the flexed muscle structure of the carcass, the weaker and more delicate carcass areas are protected from strain and tearing. In this manner possible reduction in value of carcasses due to damage inflicted during hide pulling is minimized.

While in the foregoing specification, I have set forth embodiments in considerable detail for purposes of illustration and description of this new process, it will be undestood that many modifications can be made by those skilled in the art without departing from the spirit and scope of the invention.

What is claimed is:

1. In a process for removing the hide from a livestock carcass the step of applying an electric current to the carcass as hide pulling forces are applied, said current being sufficient to cause carcass muscle contraction.

2. In a process for removing the hide from livestock carcasses, the steps of:
   (a) contacting a carcass with a pluality of electrodes in spaced apart relationship, and
   (b) passing an electric current between said electrodes through said carcass as hide is pulled from said carcass.

3. The process according to claim 2 wherein at least one electrode is inserted in the hindquarter area and at least one electrode is inserted into the forequarter area.

4. The process according to claim 3 wherein said electric current is passed between said electrodes through said carcass as the hide is pulled downwardly from the forequarter and head.

5. The process according to claim 4 wherein said electric current is about 10 to 480 volts and about 1 to 5 amperes.

6. The process according to claim 4 wherein said electric current is about 310 to 380 volts and 1 to 4 amperes.

7. In a process for removing the hide from livestock carcasses, the steps of:
   (a) exposing portions of carcass flesh by clearing the hide therefrom,
   (b) contacting said exposed flesh portions with a plurality of electrodes, and
   (c) passing an electric current between said electrodes through said carcass as further portions of hide are removed.

8. In a process for removing the hide from the forequarter and head of livestock carcasses having the hide previously removed from the hindquarter, belly and back of the carcass, the steps are:
   (a) contacting the carcass with a plurality of electrodes, at least one electrode contacting the hindquarter of said carcass and at least one electrode contacting the forequarter of said carcass,
   (b) passing an electric current of about 320 to 380 volts and 1 to 4 amperes between said electrodes through said carcass, and
   (c) pulling the hide downwardly from the forequarter and head as said electric current is applied to said carcass.

9. In a process for removing the hide from a livestock carcass, the steps of:
   (a) passing an electric current through the carcass, and
   (b) pulling the hide from the head of said carcass while said electric current is passed through said carcass.

References Cited

UNITED STATES PATENTS 2,335,993   12/1943   Bland et al. _____ 17—11

LUCIE H. LAUDENSLAGER, Primary Examiner

U.S. Cl. X.R.

146—227